US010006772B2

(12) United States Patent
Takeuchi et al.

(10) Patent No.: US 10,006,772 B2
(45) Date of Patent: Jun. 26, 2018

(54) MAP PRODUCTION METHOD, MOBILE ROBOT, AND MAP PRODUCTION SYSTEM

(71) Applicant: Panasonic Intellectual Property Corporation of America, Torrance, CA (US)

(72) Inventors: Kazuma Takeuchi, Osaka (JP); Yohei Nakata, Osaka (JP); Masahiko Saito, Osaka (JP); Naoyuki Harada, Osaka (JP); Shuhei Matsui, Osaka (JP); Kensuke Wakasugi, Fukui (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 1 day.

(21) Appl. No.: 15/193,930

(22) Filed: Jun. 27, 2016

(65) Prior Publication Data

US 2017/0010100 A1 Jan. 12, 2017

(30) Foreign Application Priority Data

Jul. 9, 2015 (JP) ................................ 2015-137931

(51) Int. Cl.
*G01C 21/12* (2006.01)
*G01C 21/28* (2006.01)
(Continued)

(52) U.S. Cl.
CPC ........... *G01C 21/28* (2013.01); *G05D 1/0246* (2013.01); *G05D 1/0272* (2013.01); *G05D 1/0274* (2013.01); *G05D 1/0276* (2013.01); *G06K 9/00664* (2013.01); *G06K 9/00771* (2013.01); *Y10S 901/01* (2013.01)

(58) Field of Classification Search
USPC .......................................................... 701/450
See application file for complete search history.

(56) References Cited

U.S. PATENT DOCUMENTS

| | | | | |
|---|---|---|---|---|
| 2005/0182518 A1* | 8/2005 | Karlsson | G05D 1/0246 700/253 |
| 2007/0061040 A1* | 3/2007 | Augenbraun | A47L 5/225 700/245 |

(Continued)

FOREIGN PATENT DOCUMENTS

| | | |
|---|---|---|
| JP | 2011-108084 | 6/2011 |

*Primary Examiner* — Tyler Paige
(74) *Attorney, Agent, or Firm* — Greenblum & Bernstein, P.L.C.

(57) ABSTRACT

There is provided a map production method to be performed by a mobile robot which moves in a first region and includes a first sensor and a second sensor. The map production method includes acquiring first information from the first sensor, acquiring second information from the second sensor, acquiring third information from a third sensor provided in the first region, acquiring fourth information indicating a detection region of the second sensor calculated from the first information and the second information, acquiring fifth information indicating a detection region of the third sensor calculated from the third information, and updating map information of the first region for a third region, including a first object, if a the second region overlaps with the third region is judged to be present from the fourth information and the fifth information.

19 Claims, 7 Drawing Sheets

(51) Int. Cl.
*G05D 1/02* (2006.01)
*G06K 9/00* (2006.01)

(56) References Cited

U.S. PATENT DOCUMENTS

| | | | | |
|---|---|---|---|---|
| 2008/0009969 | A1* | 1/2008 | Bruemmer | G06N 3/008 700/245 |
| 2009/0082879 | A1* | 3/2009 | Dooley | B25J 9/1658 700/3 |
| 2012/0239191 | A1* | 9/2012 | Versteeg | G06N 3/004 700/246 |
| 2013/0138246 | A1* | 5/2013 | Gutmann | G05D 1/0231 700/253 |
| 2014/0125700 | A1* | 5/2014 | Ramachandran | G09G 5/377 345/633 |

* cited by examiner

MAP PRODUCTION METHOD, MOBILE ROBOT, AND MAP PRODUCTION SYSTEM

BACKGROUND

1. Technical Field

The present disclosure relates to a map production method, a mobile robot, and a map production system.

2. Description of the Related Art

Robot technology has been developed for the purpose of exploration in an environment which a person cannot enter or automation for working in place of a person. Mobile robots which do cleaning while moving inside a house or the like have been on sale in recent years. Mobile robots are being introduced into a familiar region of human life. Such a mobile robot itself needs to accurately recognize a self position and posture and a surrounding environment in order to determine a movement route.

As a technique for estimating a self position and producing a map, simultaneous localization and mapping (SLAM) technology is known. SLAM technology uses an internal sensor which is a sensor a mobile robot includes and detects the amount of change in position and posture and an external sensor which is a sensor the mobile robot includes and captures relative information to a surrounding environment. With use of these sensors, SLAM technology can create a map of surroundings in parallel with estimation of a self position and posture without giving, in advance, map information to the mobile robot.

SLAM technology reiterates mainly two processes. A first process is to predict a current position and posture of a mobile robot from information acquired by an internal sensor and predict relative information to a surrounding environment of the mobile robot on the basis of the predicted position and posture and previously created map information. A second process is to calculate likelihood on the basis of the relative information predicted in the first process and relative information to an actual surrounding environment obtained by an external sensor. The weight of the reliability of the internal sensor and that of the external sensor are determined from the calculated likelihood, and the current self position and posture of the mobile robot and the map information are updated.

A method for implementing autonomous movement in an environment with a change in map is disclosed in Japanese Unexamined Patent Application Publication No. 2011-108084. An autonomous running car disclosed in Japanese Unexamined Patent Application Publication No. 2011-108084 calculates the possibility of running of the autonomous running car itself by estimating a self position and posture with respect to an object using a laser beam or a sensor of, for example, a camera. The autonomous running car disclosed in Japanese Unexamined Patent Application Publication No. 2011-108084 judges the possibility of running of an autonomous running car on the basis of the calculated possibility of running of the autonomous running car itself and the possibility of running obtained by a flight vehicle.

SUMMARY

A mobile robot which explores or works in place of a person is required to judge the possibility of running and produce a higher-accuracy map. However, as for the autonomous running car disclosed in Japanese Unexamined Patent Application Publication No. 2011-108084, production of a higher-accuracy map is not considered.

In one general aspect, the techniques disclosed here feature a map production method to be performed by a first mobile robot which moves in a first region and includes a first sensor and a second sensor, the map production method including acquiring first information from the first sensor, the first information indicating an amount of movement of the first mobile robot, acquiring second information from the second sensor, the second information indicating a distance from a first object in an observation region of the first mobile robot to the first mobile robot, acquiring third information from a third sensor provided in the first region, the third information including video information of an observation region of the third sensor, acquiring fourth information indicating a detection region of the second sensor which is calculated based on the first information and the second information, acquiring fifth information indicating a detection region of the third sensor which is calculated based on the third information, judging, based on the fourth information and the fifth information, whether a second region where the detection region of the second sensor overlaps with the detection region of the third sensor is present, and updating map information of the first region which is stored in advance in the first mobile robot for a third region, including the first object, if the second region is judged to be present.

In another general aspect, the techniques disclosed here feature a map production method to be performed by a first mobile robot which moves in a first region and includes a first sensor and a second sensor, the map production method including acquiring first information from the first sensor, the first information indicating an amount of movement of the first mobile robot, acquiring second information from the second sensor, the second information indicating a distance from a first object in an observation region of the first mobile robot to the first mobile robot, acquiring third information from a third sensor provided in the first region, the third information including video information of an observation region of the third sensor, acquiring fourth information indicating a detection region of the second sensor which is calculated based on the first information and the second information, acquiring fifth information indicating a detection region of the third sensor which is calculated based on the third information, judging, based on the fourth information, the fifth information, and map information of the first region which is stored in advance in the first mobile robot, whether a second object in a second region outside the detection region of the second sensor and within the detection region of the third sensor is changed from a first position to a second position, and updating the map information of the first region for the second region if the second object is judged to be changed from the first position to the second position.

These general and specific aspects may be implemented using a system, a method, and a computer program, and any combination of systems, methods, and computer programs.

According to the present disclosure, a higher-accuracy map can be produced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
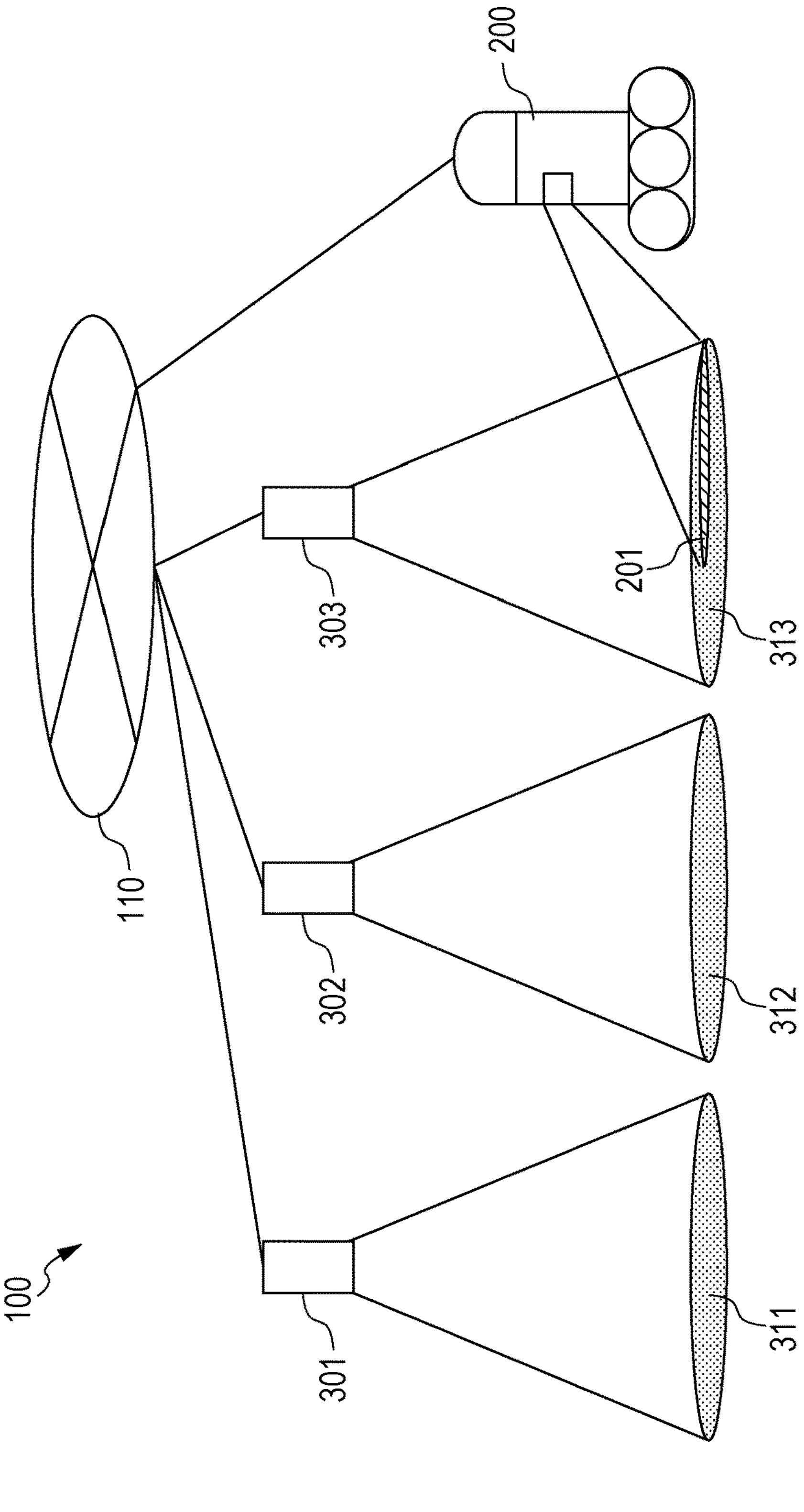
FIG. 1 is a schematic configuration diagram of a map production system according to a first embodiment of the present disclosure.

DETAILED DESCRIPTION (1) A map production method according to a first aspect of the present disclosure is a map production method to be performed by a first mobile robot which moves in a first region and includes a first sensor and a second sensor, the map production method including acquiring first information from the first sensor, the first information indicating an amount of movement of the first mobile robot, acquiring second information from the second sensor, the second information indicating a distance from a first object present in an observation region of the first mobile robot to the first mobile robot, acquiring third information from a third sensor provided in the first region, the third information including video information of an observation region of the third sensor, acquiring fourth information indicating a detection region of the second sensor which is calculated based on the first information and the second information, acquiring fifth information indicating a detection region of the third sensor which is calculated based on the third information, judging, based on the fourth information and the fifth information, whether a second region where the detection region of the second sensor overlaps with the detection region of the third sensor is present, and updating map information of the first region which is stored in advance in the first mobile robot for a third region, including the first object, if the second region is judged to be present.

With the above-described configuration, map information of a mobile robot can be updated in a region where a detection region of an external sensor of the mobile robot overlaps with a detection region of an environmental sensor. This allows production of a higher-accuracy map.

(2) In the aspect, the method may further include estimating sixth information indicating a current position and posture of the first mobile robot based on the first information and the second information, and the fourth information may be calculated based on the sixth information.

With the above-described configuration, reliability of map information on a region where a detection region of an external sensor of a mobile robot overlaps with a detection region of an environmental sensor can be improved. This allows production of a higher-accuracy map.

(3) In the aspect, the map information of the first region may be updated by updating reliability of first positional information indicating a position of the first object.

With the above-described configuration, reliability of map information on a region where a detection region of an external sensor of a mobile robot overlaps with a detection region of an environmental sensor can be improved. This allows production of a higher-accuracy map.

(4) In the aspect, the reliability of the first positional information may be updated by updating a first variance value of the first positional information to a second variance value smaller than the first variance value.

With the above-described configuration, reliability of map information for a region where a detection region of an external sensor of a mobile robot overlaps with a detection region of an environmental sensor can be improved. This allows production of a higher-accuracy map.

(5) In the aspect, the third sensor may be arranged in the first region, the map information of the first region may be expressed in a first coordinate system, the fifth information may be expressed in a second coordinate system, and the map production method may further include performing transformation from the second coordinate system into the first coordinate system.

With the above-described configuration, coordinates in a detection region of an environmental sensor arranged in a surrounding environment can be made to correspond to coordinates in map information of a mobile robot. This allows production of a map having even higher accuracy.

(6) In the aspect, the third sensor may be provided in a second mobile robot different from the first mobile robot, the map information of the first region may be expressed in a first coordinate system, the fifth information may be expressed in a second coordinate system of the second mobile robot, and the map production method may further include performing transformation from the second coordinate system into the first coordinate system.

With the above-described configuration, map information can be produced using a second external sensor of a second mobile robot as an environmental sensor. This allows production of a high-accuracy map in a short time.

(7) A map production method according to a second aspect of the present disclosure is a map production method to be performed by a first mobile robot which moves in a first region and includes a first sensor and a second sensor, the map production method including acquiring first information from the first sensor, the first information indicating an amount of movement of the first mobile robot, acquiring second information from the second sensor, the second information indicating a distance from a first object in an observation region of the first mobile robot to the first mobile robot, acquiring third information from a third sensor provided in the first region, the third information including video information of an observation region of the third sensor, acquiring fourth information indicating a detection region of the second sensor which is calculated based on the first information and the second information, acquiring fifth information indicating a detection region of the third sensor which is calculated based on the third information, judging, based on the fourth information, the fifth information, and map information of the first region which is stored in advance in the first mobile robot, whether a second object in a second region outside the detection region of the second sensor and within the detection region of the third sensor is changed from a first position to a second position, and updating the map information of the first region for the second region if the second object is judged to be changed from the first position to the second position.

With the above-described configuration, an environmental change outside a detection region of an external sensor can be detected on the basis of environmental information acquired by an environmental sensor. This allows a mobile robot to update map information on a region where an environmental change is detected, using information from the environmental sensor. As a result, even if an environmental change occurs, a higher-accuracy map can be produced.

(8) In the aspect, the method may further include estimating sixth information indicating a current position and posture of the first mobile robot based on the first information and the second information, and the fourth information may be calculated based on the sixth information.

With the above-described configuration, a mobile robot can robustly estimate a self position and posture. This allows production of a higher-accuracy map.

(9) In the aspect, the map information of the first region for the second region may be updated by updating reliability of first positional information indicating a position of the second object.

With the above-described configuration, a mobile robot can update reliability of map information on a region where an environmental change is detected, using information from an environmental sensor. As a result, even if an environmental change occurs, a higher-accuracy map can be produced.

(10) In the aspect, the reliability of the first positional information may be updated by updating a first variance value of the first positional information to a second variance value larger than the first variance value.

With the above-described configuration, reliability of map information on a region where an environmental change is detected can be reduced. This allows a mobile robot to estimate a self position and posture on the basis of map information on a portion having high reliability without dependence on map information on a portion having low reliability. As a result, a higher-accuracy map can be produced.

(11) In the aspect, the second variance value may be made larger than the first variance value in accordance with an amount of change from the first position to the second position.

With the above-described configuration, a self position and posture of a mobile robot can be more accurately estimated by increasing a value of variance such that the value corresponds to the amount of an environmental change. This allows production of map information having even higher accuracy.

(12) In the aspect, if the current position of the first mobile robot is not present in the detection region of the third sensor and the detection region of the second sensor does not overlap with the detection region of the third sensor, the map information of the first region may be updated for the second region.

With the above-described configuration, even if an environmental change occurs in a blind spot of a mobile robot, reliability of map information on a region where the environmental change is detected can be updated using information acquired by an environmental sensor. For this reason, even if an environmental change occurs in a blind spot of the mobile robot, map information of a region with the change can be modified in a short time, and a high-accuracy map can be produced.

(13) In the aspect, the third sensor may be arranged in the first region, the map information of the first region may be expressed in a first coordinate system, the fifth information may be expressed in a second coordinate system, and the map production method may further include performing transformation from the second coordinate system into the first coordinate system.

With the above-described configuration, coordinates in a detection region of an environmental sensor arranged in a surrounding environment can be made to correspond to coordinates in map information of a mobile robot. This allows production of a map having even higher accuracy.

(14) In the aspect, the third sensor may be provided in a second mobile robot different from the first mobile robot, the map information of the first region may be expressed in a first coordinate system, the fifth information may be expressed in a second coordinate system of the second mobile robot, and the map production method may further include performing transformation from the second coordinate system into the first coordinate system.

With the above-described configuration, map information can be produced using a second external sensor of a second mobile robot as an environmental sensor. This allows production of a high-accuracy map in a short time.

(15) In the aspect, the method may further include updating a third variance value of a third region, for which the second information is not acquired from the second sensor for a predetermined time, to a fourth variance value larger than the third variance value for the map information.

With the above-described configuration, reliability of map information on a region, for which external information is not acquired by an external sensor for a predetermined time, can be reduced. This allows estimation of a self position and posture on the basis of map information of a portion having high reliability without dependence on map information of a portion having low reliability. As a result, a higher-accuracy map can be produced.

(16) A mobile robot according to a third aspect of the present disclosure is a mobile robot which moves in a first region, the mobile robot including a first sensor and a second sensor, in which the mobile robot acquires first information from the first sensor, the first information indicating an amount of movement of the mobile robot, acquires second information from the second sensor, the second information indicating a distance from a first object in an observation region of the mobile robot to the mobile robot, acquires third information from a third sensor provided in the first region, the third information including video information of an observation region of the third sensor, acquires fourth information indicating a detection region of the second sensor which is calculated based on the first information and the second information, acquires fifth information indicating a detection region of the third sensor which is calculated based on the third information, judges, based on the fourth information and the fifth information, whether a second region where the detection region of the second sensor overlaps with the detection region of the third sensor is present, and updates map information of the first region which is stored in advance in the mobile robot for a third region, including the first object, if the second region is judged to be present.

With the above-described configuration, map information of a mobile robot can be updated using information acquired by an environmental sensor in a region where a detection region of an external sensor of the mobile robot overlaps with a detection region of the environmental sensor. This allows production of a higher-accuracy map.

(17) A mobile robot according to a fourth aspect of the present disclosure is a mobile robot which moves in a first region, the mobile robot including a first sensor and a second sensor, in which the mobile robot acquires first information from the first sensor, the first information indicating an amount of movement of the mobile robot, acquires second information from the second sensor, the second information indicating a distance from a first object in an observation region of the mobile robot to the mobile robot, acquires third information from a third sensor provided in the first region, the third information including video information of an observation region of the third sensor, acquires fourth information indicating a detection region of the second sensor which is calculated based on the first information and the second information, acquires fifth information indicating a detection region of the third sensor which is calculated based on the third information, judges, based on the fourth information, the fifth information, and map information of the first region which is stored in advance in the mobile robot, whether a second object in a second region outside the detection region of the second sensor and within the detection region of the third sensor is changed from a first position to a second position, and updates the map information of the first region for the second region if the second object is judged to be changed from the first position to the second position.

With the above-described configuration, an environmental change outside a detection region of an external sensor can be detected on the basis of environmental information acquired by an environmental sensor. This allows a mobile robot to update map information on a region where an environmental change is detected, using information from the environmental sensor. As a result, even if an environmental change occurs, a higher-accuracy map can be produced.

(18) A map production system according to a fifth aspect of the present disclosure is a map production system including a mobile robot which includes a first sensor and a second sensor and moves in a first region, a third sensor provided in the first region, and a server connected to the mobile robot and the third sensor, in which the server acquires first information from the first sensor, the first information indicating an amount of movement of the first mobile robot, acquires second information from the second sensor, the second information indicating a distance from a first object in an observation region of the mobile robot to the mobile robot, acquires third information from the third sensor installed in the first region, the third information including video information of an observation region of the third sensor, acquires fourth information indicating a detection region of the second sensor which is calculated based on the first information and the second information, acquires fifth information indicating a detection region of the third sensor which is calculated based on the third information, judges, based on the fourth information and the fifth information, whether a second region where the detection region of the second sensor overlaps with the detection region of the third sensor is present, and updates map information of the first region which is stored in advance in the mobile robot for a third region, including the first object, if the second region is judged to be present.

With the above-described configuration, map information in a region where a detection region of an external sensor of a mobile robot overlaps with a detection region of an environmental sensor can be updated using information acquired by the environmental sensor. This allows production of a higher-accuracy map.

(19) A map production system according to a sixth aspect of the present disclosure is a map production system including a mobile robot which includes a first sensor and a second sensor and moves in a first region, a third sensor provided in the first region, and a server connected to the mobile robot and the third sensor, in which the server acquires first information from the first sensor, the first information indicating an amount of movement of the mobile robot, acquires second information from the second sensor, the second information indicating a distance from a first object in an observation region of the mobile robot to the mobile robot, acquires third information from the third sensor provided in the first region, the third information including video information of an observation region of the third sensor, acquires fourth information indicating a detection region of the second sensor which is calculated based on the first information and the second information, acquires fifth information indicating a detection region of the third sensor which is calculated based on the third information, judges, based on the fourth information, the fifth information, and map information of the first region which is stored in advance in the mobile robot, whether a second object in a second region outside the detection region of the second sensor and within the detection region of the third sensor is changed from a first position to a second position, and updates the map information of the first region for the second region if the second object is judged to be changed from the first position to the second position.

With the above-described configuration, an environmental change outside a detection region of an external sensor can be detected on the basis of environmental information acquired by an environmental sensor. This allows a server to update map information on a region where an environmental change is detected, using information from the environmental sensor. As a result, even if an environmental change occurs, a higher-accuracy map can be produced.

(Underlying Knowledge Forming Basis of One Form of the Present Disclosure)

Once map information having high reliability is created, a self position and posture of a mobile robot is estimated exclusively on the basis of information from an external sensor and the created map information in a region, for which the map information is created, in SLAM technology.

In the autonomous running car disclosed in Japanese Unexamined Patent Application Publication No. 2011-108084, map information is produced by a flying vehicle and the autonomous running car itself, and then a position and posture of the autonomous running car with respect to an object is estimated on the basis of the produced map information and information obtained by a sensor of the autonomous running car.

Japanese Unexamined Patent Application Publication No. 2011-108084 describes calculating the possibility of running of the autonomous running car using information acquired by the autonomous running car and information from the flying vehicle. However, as for the autonomous running car disclosed in Japanese Unexamined Patent Application Publication No. 2011-108084, improving the accuracy of map production using information from an external sensor, such as an environmental sensor, is not considered.

If a surrounding environment changes due to a disturbance, an actual map and map information of the autonomous running car do not correspond in the autonomous running car disclosed in Japanese Unexamined Patent Application Publication No. 2011-108084. The autonomous running car cannot estimate the self position and posture on the basis of the map information of the autonomous running car and information from a sensor. Additionally, in the autonomous running car disclosed in Japanese Unexamined Patent Application Publication No. 2011-108084, it takes a long time to update map information on a region with an environmental change such that the map information corresponds to an actual map. These problems are problems newly found by the inventors.

Through intense studies, the inventors have found that high-accuracy map information can be produced by updating the reliability of map information of a mobile robot on the basis of environmental information acquired by an environmental sensor.

An embodiment of the present disclosure will be described below with reference to the accompanying drawings. Elements are exaggerated in each drawing for ease of explanation.

(First Embodiment)

[System Configuration]

FIG. 1 shows a schematic configuration diagram of a map production system according to a first embodiment. As shown in FIG. 1, a map production system 100 includes a network 110, a mobile robot 200, and environmental sensors 301, 302, and 303.

In the map production system 100, the mobile robot 200 is connected to the plurality of environmental sensors 301, 302, and 303 via the network 110. The environmental sensors 301, 302, and 303 are arranged in advance at predetermined intervals in a surrounding environment. The environmental sensors 301, 302, and 303 acquire environmental information within detection regions 311, 312, and 313, respectively, from above the mobile robot 200. The detection regions 311, 312, and 313 are respective regions where the environmental sensors 301, 302, and 303 can observe the surrounding environment. The mobile robot 200 acquires external information within the detection region 201 by the external sensor described later.

[Mobile Robot]

The mobile robot 200 will next be described.

The mobile robot 200 has a configuration equivalent to that of a common autonomous running robot. More specifically, the mobile robot 200 includes a driving device which moves in accordance with movement control information. The mobile robot 200 is configured to be capable of estimating a self position and posture, communicating with an environmental sensor, and producing map information.

In the present specification, the term "position" refers to a location in map information. The term "posture" refers to an orientation of the mobile robot 200, and the orientation is expressed as, for example, a rotation angle with respect to a predetermined reference direction. Examples of the orientation include not only a horizontal orientation but also a three-dimensional orientation.

Figure 2:
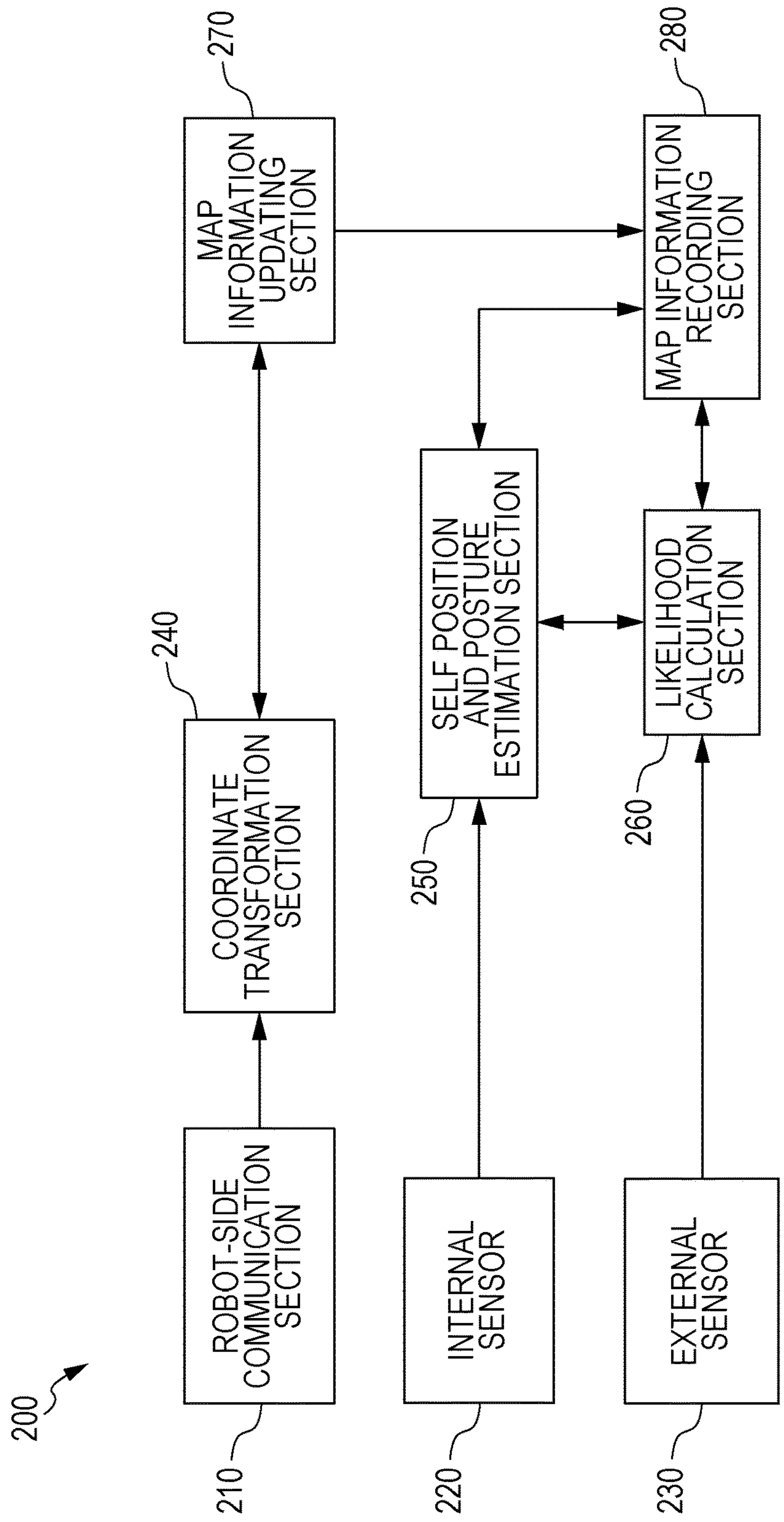
FIG. 2 is a block diagram showing the configuration of a mobile robot according to the first embodiment of the present disclosure.

FIG. 2 is a block diagram showing the configuration of the mobile robot 200. As shown in FIG. 2, the mobile robot 200 includes a robot-side communication section 210, an internal sensor 220, an external sensor 230, a coordinate transformation section 240, a self position and posture estimation section 250, a likelihood calculation section 260, a map information updating section 270, and a map information recording section 280. Although the mobile robot 200 also includes a control section which controls the elements, the control section is not shown in FIG. 2 for illustrative simplicity.

<Robot-Side Communication Section>

The robot-side communication section 210 is a communication device which communicates with the environmental sensors 301, 302, and 303. The robot-side communication section 210 communicates with the environmental sensors 301, 302, and 303 via the network 110 and acquires environmental information within the detection regions 311, 312, and 313 of the environmental sensors 301, 302, and 303. The robot-side communication section 210 gains access to the network 110 through wireless communication. The environmental information from the environmental sensors 301, 302, and 303 acquired by the robot-side communication section 210 is sent to the coordinate transformation section 240.

<Internal Sensor>

The internal sensor 220 acquires internal information on the mobile robot 200. The internal information is information for predicting a current self position and posture of the mobile robot 200 and is, for example, information on, for example, the amount of movement of the mobile robot 200. An acceleration sensor, an angular velocity sensor, a rotary encoder which measures the amount of rotation of a wheel, or the like can be used as the internal sensor 220. Internal information acquired by the internal sensor 220 is sent to the self position and posture estimation section 250.

<External Sensor>

The external sensor 230 acquires external information on the mobile robot 200. The external information is information on an actual surrounding environment in an observation region of the external sensor 230 and is, for example, information, such as a distance between an object arranged in the surrounding environment and the mobile robot 200. A camera, an optical distance measuring sensor which measures a distance by the time of flight (TOF) method, or the like can be used as the external sensor 230. External information acquired by the external sensor 230 is sent to the likelihood calculation section 260.

<Coordinate Transformation Section>

The coordinate transformation section 240 receives environmental information from the robot-side communication section 210. The coordinate transformation section 240 transforms coordinates in the environmental information into coordinates in map information of the mobile robot 200. The transformation of the coordinates in the environmental information into the coordinates in the map information of the mobile robot 200 is performed by giving in advance coordinates of installation positions of the environmental sensors 301, 302, and 303 to the coordinate transformation section 240. The environmental information after the coordinate transformation by the coordinate transformation section 240 is sent to the map information updating section 270.

<Self Position and Posture Estimation Section>

The self position and posture estimation section 250 predicts a current self position and posture of the mobile robot 200 on the basis of internal information acquired by the internal sensor 220. More specifically, the self position and posture estimation section 250 calculates a current predicted self position and posture from information on a previous position and posture of the mobile robot 200 recorded in the map information recording section 280, using information on the amount of movement obtained by the internal sensor 220. The information of the calculated self position and posture is sent to the likelihood calculation section 260 and is used to calculate anticipated predicted external information which is obtained from the self position and posture predicted by the self position and posture estimation section 250. The self position and posture estimation section 250 receives likelihood information from the likelihood calculation section 260. The self position and posture estimation section 250 calculates a deviation in self position and posture on the basis of the likelihood information and the information of the predicted self position and posture and estimates a current self position and posture of the mobile robot 200. The information of the self position and posture estimated by the self position and posture estimation section 250 is sent to the map information recording section 280.

<Likelihood Calculation Section>

The likelihood calculation section 260 calculates the degree of correspondence of external information obtained by the external sensor 230 with predicted external information calculated from a self position and posture predicted by the self position and posture estimation section 250, and calculates likelihood. The likelihood calculation section 260 calculates the likelihood by calculating using image feature quantities or by using the iterative closest point (ICP) method for point clouds. The information of the likelihood calculated by the likelihood calculation section 260 is sent to the self position and posture estimation section 250 and to the map information recording section 280.

<Map Information Updating Section>

The map information updating section 270 judges whether there is any region where the detection regions 311, 312, and 313 of the environmental sensors 301, 302, and 303 overlap with the detection region 201 of the external sensor 230. If the map information updating section 270 judges that there is a region of overlap, the map information updating section 270 updates the reliability of map information for the region of overlap on the basis of environmental information acquired by the environmental sensors 301, 302, and 303. More specifically, the map information updating section 270 increases the reliability of the map information on the region of overlap by reducing a value of variance in the region of overlap.

A description of the term "variance" will be given with reference to FIG. 3.

Figure 3:
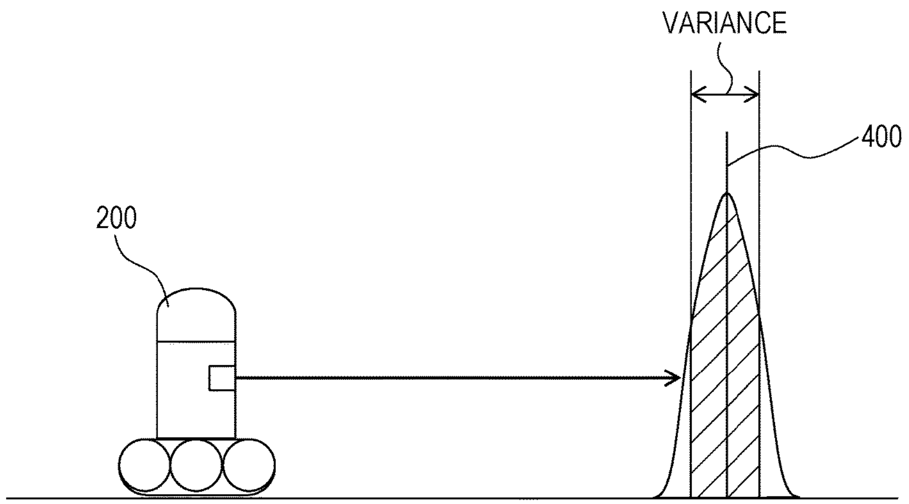
FIG. 3 is a diagram for explaining the definition of variance.

FIG. 3 is a diagram for explaining the definition of variance. If a distance from the external sensor 230 mounted in the mobile robot 200 to an object 400 is measured, as shown in FIG. 3, an accuracy problem arising from the resolution of the sensor or a noise problem may cause an error in the measured distance. The term "variance" in the present specification refers to the range of error. In the present specification, variance having a large value means that the range of error is wide and that the reliability of map information is low while variance having a small value means that the range of error is narrow and that the reliability of map information is high.

The map information updating section 270 includes a change detection section which receives environmental information after coordinate transformation from the coordinate transformation section 240 and detects an environmental change in a region outside the detection region 201 of the external sensor 230 on the basis of the received environmental information. If the change detection section detects an environmental change, the map information updating section 270 updates the reliability of map information on a region where the environmental change is detected. More specifically, the map information updating section 270 adds environmental information from the environmental sensors 301, 302, and 303 to map information of the mobile robot 200 and increases a value of variance for the region where the environmental change is detected. With this increase, the map information updating section 270 reduces the reliability of the map information on the region where the environmental change is detected.

The map information updating section 270 calculates the detection region 201 of the external sensor 230 on the basis of external information obtained from the external sensor 230. The map information updating section 270 also calculates the detection regions 311, 312, and 313 of the environmental sensors 301, 302, and 303 on the basis of environmental information obtained from the environmental sensors 301, 302, and 303.

Map information updated by the map information updating section 270 is sent to the map information recording section 280.

<Map Information Recording Section>

The map information recording section 280 records the information of a self position and posture estimated by the self position and posture estimation section 250, likelihood information calculated by the likelihood calculation section 260, and map information updated by the map information updating section 270. The map information recording section 280 also produces map information on the basis of likelihood information, external information acquired by the external sensor 230, and the information of a self position and posture estimated by the self position and posture estimation section 250 and records the produced map information.

[Environmental Sensor]

The environmental sensors 301, 302, and 303 will next be described.

Figure 4:
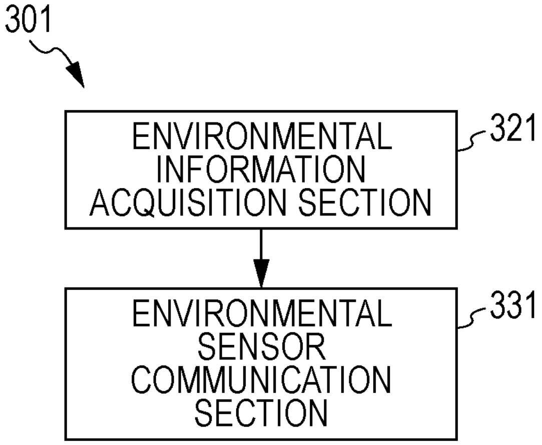
FIG. 4 is a block diagram showing the configuration of an environmental sensor according to the first embodiment of the present disclosure.

FIG. 4 is a block diagram showing the configuration of the environmental sensor 301. As shown in FIG. 4, the environmental sensor 301 includes an environmental information acquisition section 321 and an environmental sensor communication section 331.

<Environmental Information Acquisition Section>

The environmental information acquisition section 321 acquires environmental information within the detection region 311. The environmental information obtained by the environmental information acquisition section 321 is sent to the environmental sensor communication section 331. For example, an optical distance measuring camera is used as the environmental information acquisition section 321. The environmental information is, for example, information, such as video information from the camera and a depth.

<Environmental Sensor Communication Section>

The environmental sensor communication section 331 communicates with the mobile robot 200 and sends environmental information obtained by the environmental information acquisition section 321 to the mobile robot 200. More specifically, the environmental sensor communication section 331 sends the environmental information obtained by the environmental information acquisition section 321 to the robot-side communication section 210 of the mobile robot 200 via the network 110.

[Map Information Production Method]

A method for producing a map using the mobile robot 200 according to the first embodiment will be described.

<Process of Improving Map Information Accuracy>

A process of improving the accuracy of map information will be described with reference to FIGS. 5 and 6.

Figure 5:
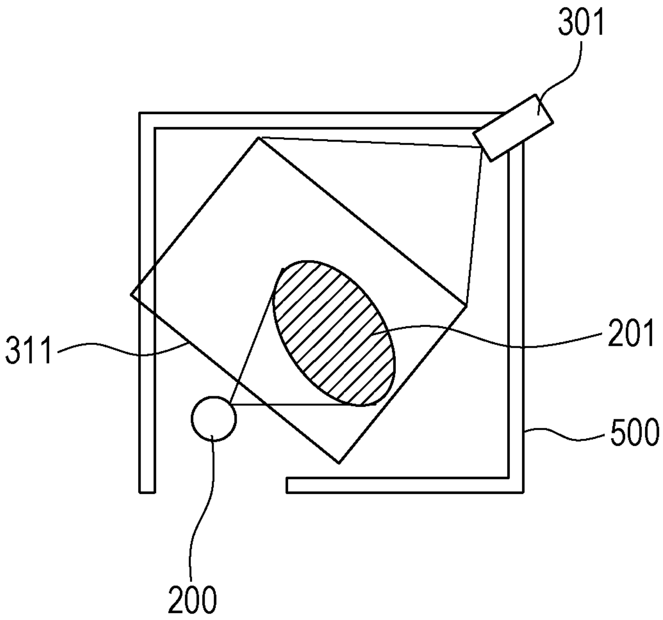
FIG. 5 is a diagram showing an example of the operation of the mobile robot and the environmental sensor according to the first embodiment of the present disclosure.

FIG. 5 shows a diagram of an example of the operation of improving the accuracy of map information of the mobile robot 200 as viewed from above. In FIG. 5, the environmental sensor 301 is arranged in a wall surface 500, and the environmental sensor 301 acquires environmental information in a region inside the wall surface 500. The environmental sensor 301 acquires environmental information within the detection region 311. The mobile robot 200 moves in the region inside the wall surface 500 and acquires external information with the external sensor 230.

As shown in FIG. 5, in a region where the detection region 201 of the external sensor 230 of the mobile robot 200 overlaps with the detection region 311 of the environmental sensor 301, the two sensors detect an identical region. In the first embodiment, the reliability of map information on the region of overlap is updated on the basis of information obtained by the external sensor 230 and information obtained by the environmental sensor 301 in order to improve the accuracy of map information. More specifically, the reliability of the map information on the region of overlap is increased by adding the information from the environmental sensor 301 to the map information produced from the external information acquired by the external sensor 230 of the mobile robot 200.

Figure 6:
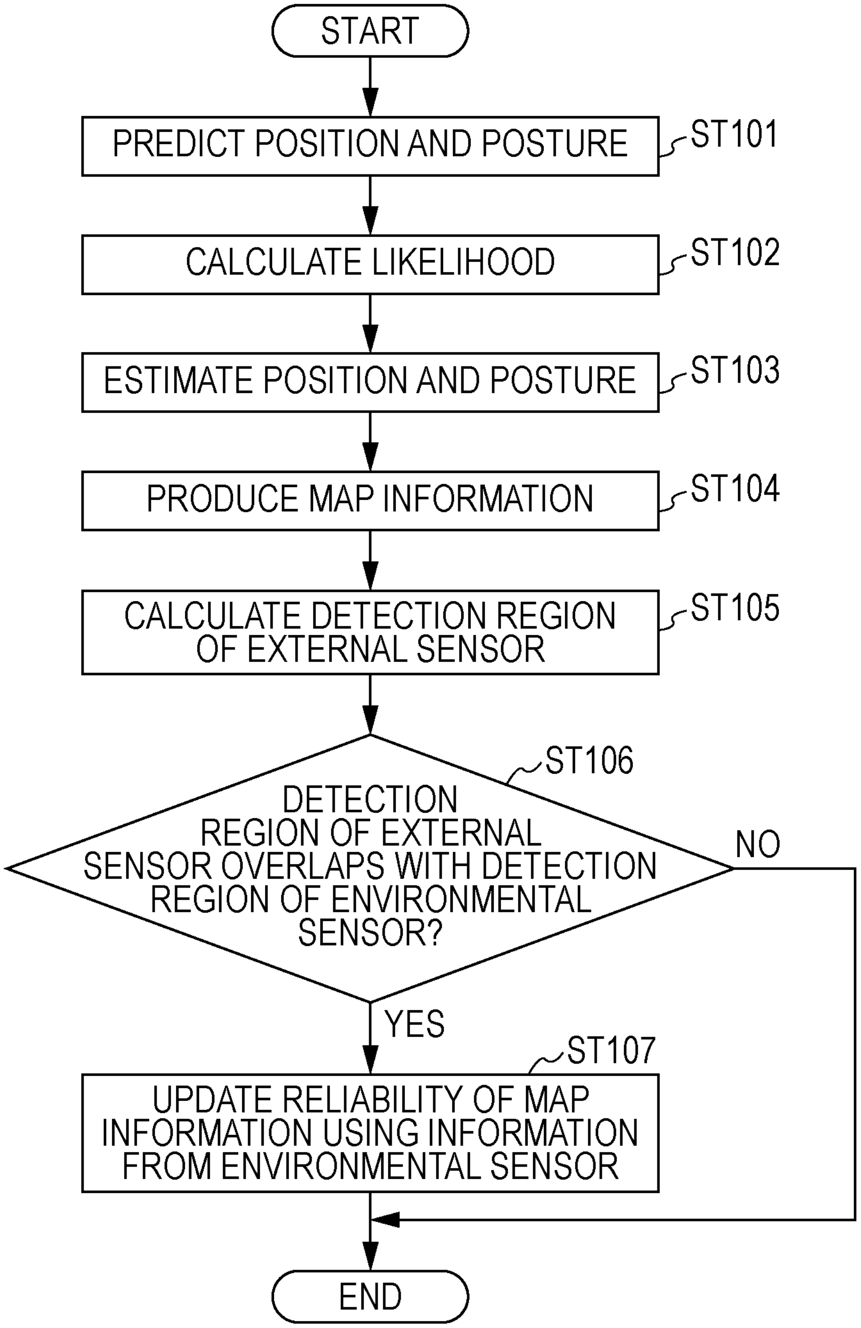
FIG. 6 is a flowchart showing a map production method according to the first embodiment of the present disclosure.

FIG. 6 is a flowchart showing the process of improving the accuracy of map information. The process of improving the accuracy of map information will be described below with reference to FIG. 6. Note that an extended Kalman filter (EKF) is used for estimation of a self position and posture of the mobile robot 200 and map creation in the process according to the first embodiment. A reciprocal of a covariance value which a landmark of a region corresponding to coordinates in map information has is used as reliability.

As shown in FIG. 6, in step ST101, a self position and posture of the mobile robot 200 is predicted using information on the amount of movement obtained by the internal sensor 220. More specifically, the self position and posture estimation section 250 calculates a current self position and posture from the information on the amount of movement and a previous self position and posture recorded in the map information recording section 280.

In step ST102, likelihood is calculated on the basis of predicted external information obtained from the information of the self position and posture predicted by the self position and posture estimation section 250 and external information obtained from the external sensor 230. More specifically, the likelihood calculation section 260 calculates anticipated predicted external information which is obtained from the self position and posture predicted in step ST101. The likelihood calculation section 260 calculates the likelihood by calculating the degree of correspondence of the predicted external information with the external information actually obtained from the external sensor 230.

In step ST103, the current self position and posture of the mobile robot 200 is estimated on the basis of the information of the likelihood obtained in step ST102 and the information of the self position and posture predicted in step ST101. More specifically, the self position and posture estimation section 250 calculates a deviation in self position and posture on the basis of the information of the likelihood and the information of the self position and posture predicted in step ST101 and estimates the current self position and posture.

In step ST104, map information is produced from the information of the current self position and posture of the mobile robot 200 obtained in step ST103 and the external information. The produced map information is recorded in the map information recording section 280.

In step ST105, the detection region 201 of the external sensor 230 of the mobile robot 200 is calculated from the information of the current self position and posture of the mobile robot 200 obtained in step ST103.

In step ST106, it is judged whether there is any region where the detection region 201 of the external sensor 230 obtained in step ST105 overlaps with the detection region 311 of the environmental sensor 301. In step ST106, the coordinate transformation section 240 transforms coordinates in environmental information obtained by the environmental sensor 301 into coordinates in the map information of the mobile robot 200. The detection region 311 of the environmental sensor 301 is calculated from the environmental information after the coordinate transformation.

If it is judged in step ST106 that there is a region of overlap, the process shifts to step ST107. On the other hand, if it is judged in step ST106 that there is no region of overlap, the process ends.

In step ST107, the reliability of the map information of the mobile robot 200 is updated using information from the environmental sensor 301. More specifically, the map information updating section 270 reduces a value of variance of map information on the region of overlap by adding the environmental information from the environmental sensor 301 and increases the reliability of the map information. The updated map information is recorded in the map information recording section 280.

In the map production method according to the first embodiment, improvement of map information accuracy is implemented by performing the above-described process. Note that a case where the detection region 311 of the one environmental sensor 301 overlaps with the detection region 201 of the external sensor 230 of the mobile robot 200 has been described above. If detection regions of a plurality of environmental sensors overlap with the detection region 201 of the external sensor 230 of the mobile robot 200, step ST107 is executed for every environmental sensor, for which a detection region of overlap is judged to be present.

[Map Information Updating Process upon Occurrence of Disturbance]

A map information updating process in a case where an environmental change occurs outside the detection region 201 of the external sensor 230 of the mobile robot 200 in the surrounding environment due to a disturbance will next be described with reference to FIGS. 7A, 7B, and 8.

Figure 7A:
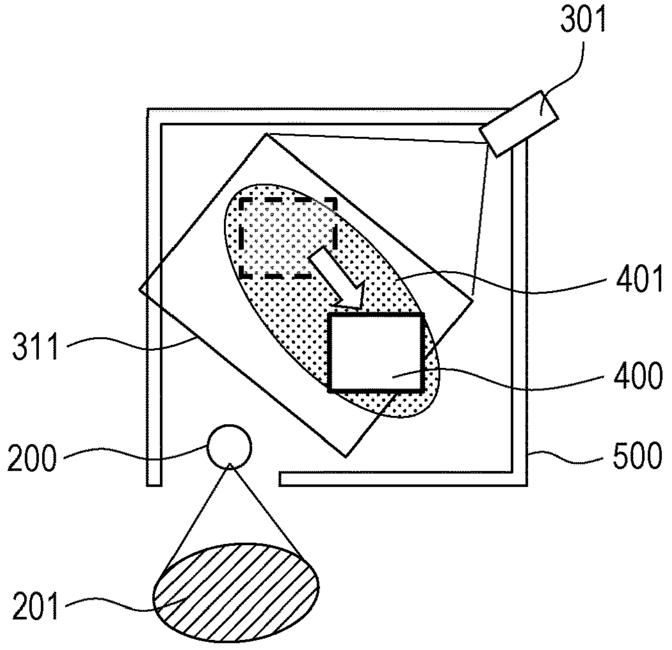
FIG. 7A is a diagram showing an example of the operation of the mobile robot and the environmental sensor according to the first embodiment of the present disclosure.
Figure 7B:
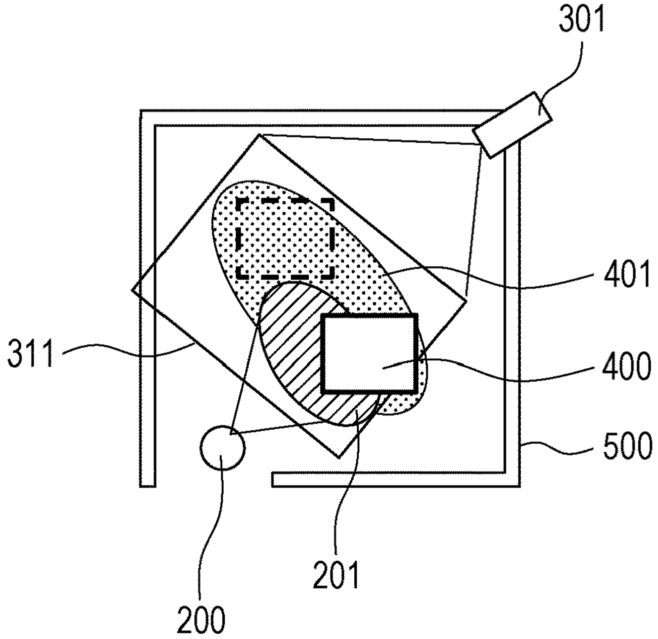
FIG. 7B is a diagram showing an example of the operation of the mobile robot and the environmental sensor according to the first embodiment of the present disclosure.

FIGS. 7A and 7B are diagrams of an example of the operation of updating map information of the mobile robot 200 upon occurrence of an environmental change as viewed from above. In FIGS. 7A and 7B, the environmental sensor 301 is arranged in the wall surface 500, and the environmental sensor 301 acquires environmental information in a region inside the wall surface 500. The environmental sensor 301 acquires environmental information within the detection region 311. The mobile robot 200 moves in the region inside the wall surface 500 and acquires external information with the external sensor 230.

If an object 400 moves in a direction of a white arrow outside the detection region 201 of the external sensor 230 of the mobile robot 200, as shown in FIG. 7A, the change detection section of the map information updating section 270 detects a region where the object 400 moves as a region 401 with an environmental change. As for the detected region 401, map information recorded in the mobile robot 200 is different from and does not correspond to an actual map. For this reason, even if the mobile robot 200 tries to estimate a self position and posture on the basis of map information recorded in itself and information obtained by the external sensor 230, the mobile robot 200 is unable to accurately estimate the self position and posture. Thus, the process of reducing the reliability of map information on the region 401 where the environmental change is detected by increasing a value of variance of the map information is performed in the first embodiment.

When the external sensor 230 of the mobile robot 200 acquires external information in the region 401 where the environmental change is detected, as shown in FIG. 7B, the map information for the region 401 has reduced reliability. For this reason, the mobile robot 200 estimates a self position and posture on the basis of map information for a portion having high reliability which does not include the region 401 where the environmental change is detected. The map information for the region 401 where the environmental change is detected can be updated with map information having high reliability by the above-described process of improving map information accuracy.

Figure 8:
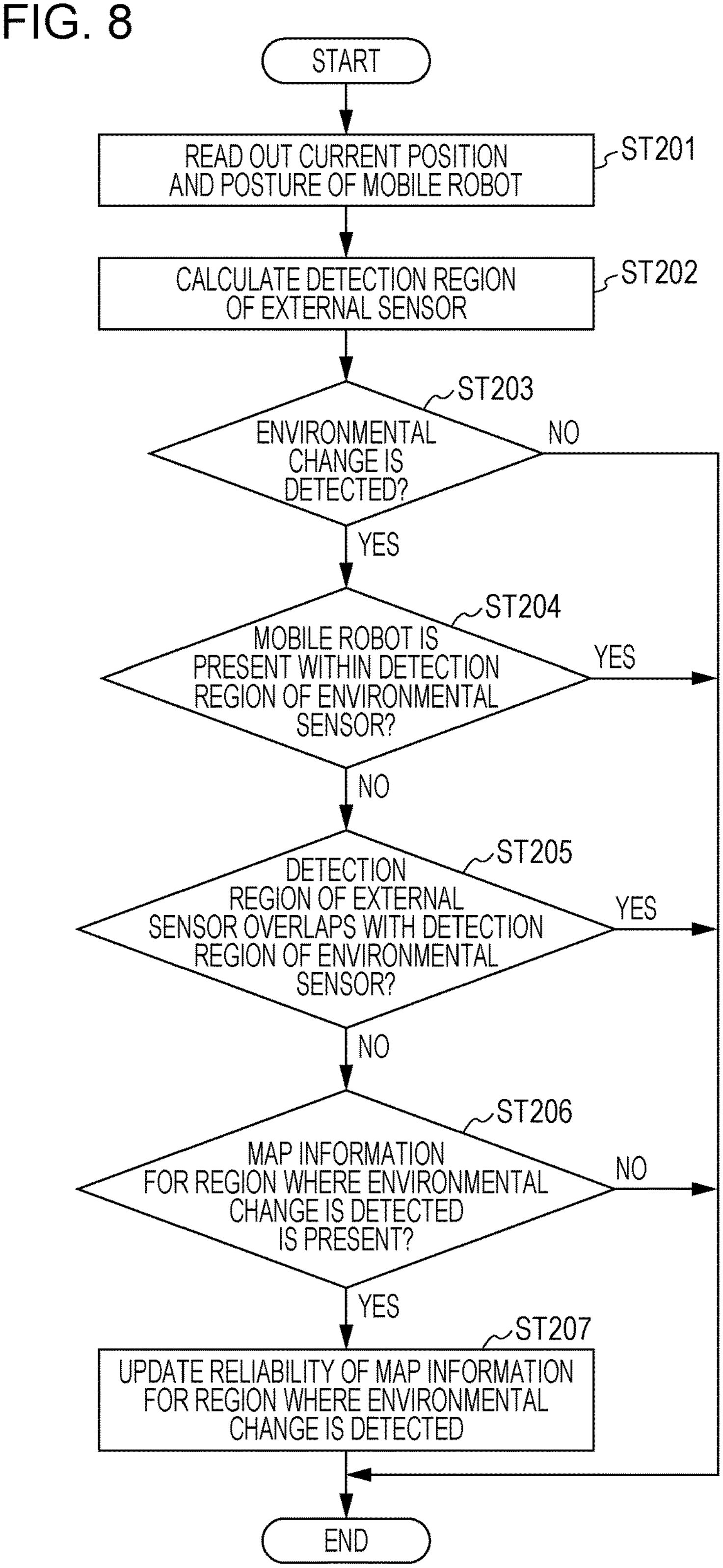
FIG. 8 is a flowchart showing a different map production method according to the first embodiment of the present disclosure.

FIG. 8 is a flowchart showing the map information updating process upon occurrence of an environmental change due to a disturbance. The map information updating process in a case where an environmental change occurs due to a disturbance outside the detection region 201 of the external sensor 230 of the mobile robot 200 will be described below with reference to FIG. 8.

As shown in FIG. 8, in step ST201, a current self position and posture of the mobile robot 200 is read out. More specifically, the information of the current self position and posture of the mobile robot 200 recorded in the map information recording section 280 is read out. The current self position and posture of the mobile robot 200 in step ST201 is a self position and posture estimated in step ST103 shown in FIG. 6 described earlier. Note that step ST201 may be replaced with steps ST101 to ST104 in FIG. 6 described earlier.

In step ST202, the detection region 201 of the external sensor 230 of the mobile robot 200 is calculated from the information of the current self position and posture of the mobile robot 200 read out in step ST201.

In step ST203, the change detection section of the map information updating section 270 detects an environmental change on the basis of environmental information from the environmental sensor 301. More specifically, the change detection section detects on the basis of the environmental information and previous map information whether the surrounding environment has changed due to a disturbance, such as movement of the object 400 within the detection region 311 of the environmental sensor 301. In step ST203, the change detection section detects the region 401 where an environmental change is detected. If an environmental change is detected in step ST203, the process shifts to step ST204. On the other hand, if no environmental change is detected, the process ends.

In step ST204, it is detected whether the mobile robot 200 is present within the detection region 311 of the environmental sensor 301. More specifically, the information of the current self position of the mobile robot 200 is read out from the map information recording section 280, and it is judged whether the mobile robot 200 is located within the detection region 311 of the environmental sensor 301. If the mobile robot 200 is not present within the detection region 311 of the environmental sensor 301 in step ST204, the process shifts to step ST205. On the other hand, if the mobile robot 200 is present within the detection region 311 of the environmental sensor 301, the process ends.

In step ST205, it is judged whether there is any region where the detection region 201 of the external sensor 230 obtained in step ST202 overlaps with the detection region 311 of the environmental sensor 301. If it is judged in step ST205 that there is no region of overlap, the process shifts to step ST206. On the other hand, if it is judged that there is a region of overlap, the process ends.

In step ST206, it is judged whether there is any map information on the region 401 where the environmental change is detected. More specifically, it is judged whether map information on the region 401 where the environmental change is detected is recorded in the map information recording section 280. If map information on the region 401 where the environmental change is detected is present in step ST206, the process shifts to step ST207. On the other hand, if there is no map information on the region 401 where the environmental change is detected, the process ends.

In step ST207, the reliability of the map information on the region 401 where the environmental change is detected is updated using information from the environmental sensor 301. More specifically, the map information updating section 270 increases a value of variance of the map information on the region 401 where the environmental change is detected and reduces the reliability of the map information on the region 401 where the environmental change is detected. The map information updating section 270 increases the value of variance in accordance with the amount of the environmental change detected by the environmental sensor 301.

In the map production method according to the first embodiment, even an environmental change due to a disturbance which has occurred in a region where direct observation by the external sensor 230 of the mobile robot 200 is impossible can be reflected in map information by performing the above-described process.

[Other Map Updating Process]

The map production method according to the first embodiment increases a value of variance of map information on a region, from which no external information has been acquired by the external sensor 230 of the mobile robot 200 for a predetermined time, of produced map information. There may be an environmental change in a region, from which no external information has been acquired for the predetermined time after production of map information. For this reason, if no external information has been acquired by the external sensor 230 for the predetermined time for produced map information, the map production method according to the first embodiment reduces the reliability of the map information on the region by increasing a value of variance of the map information. Note that the predetermined time can be arbitrarily determined depending on conditions, such as the size of a region, for which map information is to be produced, the movement velocity of the mobile robot 200, and the like.

[Effects]

The map production method and the mobile robot 200 according to the first embodiment can produce the effects below.

The map production method and the mobile robot 200 according to the first embodiment increase the reliability of map information on a region where the detection region 201 of the external sensor 230 of the mobile robot 200 overlaps with the detection region 311 of the environmental sensor 301 by reducing a value of variance of the map information. As described above, in the first embodiment, map information is created using a combination of information acquired by the external sensor 230 of the mobile robot 200 and information acquired by the environmental sensor 301. This allows high-accuracy production of map information.

According to the first embodiment, the reliability of map information on the region 401 where an environmental change is detected outside the detection region 201 of the external sensor 230 of the mobile robot 200 is reduced by reducing a value of variance of the map information on the region 401. For this reason, the mobile robot 200 can estimate a self position and posture using not map information for a portion having low reliability with an environmental change but map information for a portion having high reliability. As described above, the map production method and the mobile robot 200 according to the first embodiment can robustly estimate the self position and posture of the mobile robot 200 even if there is an environmental change due to a disturbance. Thus, even if an environmental change occurs due to a disturbance, the map production method and the mobile robot 200 according to the first embodiment can modify map information for a region with the environmental change and produce map information with high accuracy. For the region 401 where the environmental change is detected, high-accuracy map information can be reconstructed in a short time by the external sensor 230 of the mobile robot 200 and the environmental sensor 301.

By increasing the value of the variance of the map information on the region 401 where the environmental change is detected in accordance with the amount of the environmental change, the self position and posture of the mobile robot 200 can be estimated more accurately.

According to the first embodiment, if the detection region 201 of the external sensor 230 of the mobile robot 200 does not overlap with the detection region 311 of the environmental sensor 301 when the environmental change is detected, the reliability of the map information on the region 401 where the environmental change is detected is updated. It is thus possible to detect an environmental change in a blind spot of the mobile robot 200 and reflect a region with the environmental change in map information of the mobile robot 200.

According to the first embodiment, as for a region, from which no external information has been acquired by the external sensor 230 for a predetermined time after production of map information, a value of variance is increased in view of the possibility of an environmental change, and the reliability of the map information on the region is reduced. For this reason, the map production method and the mobile robot 200 according to the first embodiment can robustly estimate the self position and posture of the mobile robot 200.

Note that although a configuration in which the mobile robot 200 communicates with the environmental sensors 301, 302, and 303 via the network 110 has been described in the first embodiment, the present disclosure is not limited to this. For example, a system configuration including a server which communicates with the mobile robot 200 and the environmental sensors 301, 302, and 303 via the network 110 may be adopted. In this system configuration, the processes in the steps shown in FIGS. 6 and 8 may be executed on the server side. That is, the server may include the self position and posture estimation section 250 and the map information updating section 270. For example, the server acquires environmental information obtained from the environmental sensors 301, 302, and 303 and external information and internal information acquired from the mobile robot 200 via the network 110. The server may perform the process of improving map information accuracy or the map information updating process upon occurrence of a disturbance on the basis of the acquired pieces of information.

Although an example in which the change detection section of the map information updating section 270 detects an environmental change on the basis of environmental information from the environmental sensor 301 has been described in the first embodiment, the present disclosure is not limited to this. For example, an environmental change may be detected by the environmental sensors 301, 302, and 303.

Although map information accuracy is improved on the basis of environmental information obtained from the environmental sensors 301, 302, and 303 in the first embodiment, the present disclosure is not limited to this. For example, if a distance measuring sensor is used as each of the environmental sensors 301, 302, and 303, the accuracy of the information of the self position and posture of the mobile robot 200 can be enhanced by performing likelihood calculation processing on the information of the self position and posture.

Although the coordinate transformation section 240 transforms coordinates in environmental information into coordinates in the map information of the mobile robot 200 by acquiring in advance installation positions of the environmental sensors 301, 302, and 303 in the first embodiment, the present disclosure is not limited to this. For example, the environmental sensors 301, 302, and 303 may capture the mobile robot 200, and a transformation parameter may be estimated on the basis of positional information estimated by the self position and posture estimation section 250 and coordinates captured by the environmental sensors 301, 302, and 303. For example, if the mobile robot 200 moves on a two-dimensional plane, the coordinate transformation section 240 can transform environmental information into coordinates in the map information of the mobile robot 200 by performing projective transformation of the environmental information.

Although an example in which the environmental sensors 301, 302, and 303 are fixed and arranged at predetermined intervals in a surrounding environment has been described in the first embodiment, the present disclosure is not limited to this. For example, an environmental sensor may be a sensor which can change a detection region, such as an oscillating type sensor which changes in installation angle from hour to hour. An environmental sensor which can change a detection region can acquire environmental information over a wider range. In the case of an oscillating type sensor, coordinates in environmental information can be transformed into coordinates in the map information of the mobile robot 200 by notifying the coordinate transformation section 240 of an installation angle at the time of acquiring the environmental information.

Although a configuration including one internal sensor 220 and one external sensor 230 has been described in the first embodiment, the present disclosure is not limited to this. It is only necessary to provide at least one internal sensor 220 and at least one external sensor 230. Since use of a plurality of internal sensors 220 and a plurality of external sensors 230 allows acquisition of more internal information and more external information, the self position and posture of the mobile robot 200 can be estimated with higher accuracy.

Although an acceleration sensor or an angular velocity sensor has been described as the internal sensor 220 in the first embodiment, the present disclosure is not limited to this. For example, a magnetic field sensor, a visual odometry using a camera, or the like may be used as the internal sensor 220.

Although a configuration using the three environmental sensors 301, 302, and 303 has been described in the first embodiment, it is only necessary to provide at least one environmental sensor. The number of environmental sensors may be determined by various conditions, such as a region, for which map information is to be produced, and the complexity of a surrounding environment. Since use of a plurality of environmental sensors allows acquisition of more environmental information, higher-accuracy map information can be produced.

In the first embodiment, map information to be produced may be two-dimensional map information or three-dimensional map information. Map information refers to information combining coordinates of an obstacle position with the amounts of variance in axial directions. Map information can be visually expressed in, for example, a grid map, a diagram, a point chart, or the like.

Although an example in which one mobile robot 200 produces a map has been described in the first embodiment, it is only necessary to provide at least one mobile robot. Use of a plurality of mobile robots allows production of high-accuracy map information in a short time.

If a plurality of mobile robots are used, the external sensor 230 mounted on each mobile robot can also be used as an environmental sensor. External information acquired by the external sensor 230 of each mobile robot can be used to estimate a self position and posture and used as environmental information in a surrounding environment. This configuration allows production of high-accuracy map information in a shorter time.

Sharing and processing map information by a plurality of robots allow high-frequency updating of a wide-area map. For this reason, use of a plurality of robots is useful for, for example, monitoring services. The process of improving map information accuracy shown in FIG. 6 and the map information updating process upon occurrence of a disturbance shown in FIG. 8 can be performed on a region which cannot be observed by an environmental sensor at a fixed position. Thus, the use of a plurality of robots can achieve improvement of map information accuracy in a blind spot region of an environment sensor.

Note that although the map production method according to the first embodiment has described the process of giving in advance no map information to the mobile robot 200, the present disclosure is not limited to this. For example, map information may be given in advance to the mobile robot 200, and the map information may be updated on an as-needed basis.

Although the processes shown in FIGS. 6 and 8 have been described in detail in the first embodiment, the present disclosure is not limited to these processes. The processes shown in FIGS. 6 and 8 are merely examples. Some processes may be omitted or a known process may be added.

Although an example in which the process ends if it is judged in step ST205 that there is a region of overlap has been described in the first embodiment, the present disclosure is not limited to this. For example, in step ST205, the above-described process of improving map information accuracy may be performed on a region of overlap.

Although the present disclosure has been fully described in connection with the preferred embodiment thereof with reference to the accompanying drawings, it is to be noted that various changes and modifications are apparent to those skilled in the art. Such changes and modifications are to be understood as being included within the scope of the present disclosure as defined by the appended claims unless they depart therefrom. For example, a mobile robot may be a vehicle, and an environmental sensor may be a surveillance camera. An external sensor and an environmental sensor may each be a laser range finder (LRF), a laser imaging detection and ranging (LIDAR) sensor, a camera, a depth camera, a stereo camera, a radar, or a time of flight (TOF) camera.

The present disclosure is useful for recognition of the position of a robot which moves autonomously in a disturbance-prone environment. The present disclosure is applied to a robot for infrastructure inspection and ocean exploration which moves in an environment fraught with obstacles and is useful in a case where a map is created simultaneously with position recognition.

What is claimed is:

1. A map production method to be performed by a first mobile robot which moves in a first region and includes a first sensor and a second sensor, the map production method comprising:

acquiring first information from the first sensor, the first information indicating an amount of movement of the first mobile robot;

acquiring second information from the second sensor, the second information indicating a distance from a first object present in an observation region of the first mobile robot to the first mobile robot;

acquiring third information from a third sensor provided in the first region and being physically separate from the first mobile robot, the third information including video information of an observation region of the third sensor;

acquiring a sensed region of the second sensor which is calculated based on the first information and the second information;

acquiring a sensed region of the third sensor which is calculated based on the third information;

judging whether the sensed region of the second sensor overlaps with the sensed region of the third sensor; and updating map information of the first region which is stored in advance in the first mobile robot for a second region in which the first object exists if the sensed region of the second sensor is judged to overlap with the sensed region of the third sensor.

2. The map production method according to claim 1, further comprising estimating a current position and posture of the first mobile robot based on the first information and the second information, wherein the sensed region of the second sensor is calculated based on the current position and posture of the first mobile robot.

3. The map production method according to claim 1, wherein the map information of the first region is updated by updating reliability of first positional information indicating a position of the first object.

4. The map production method according to claim 3, wherein the reliability of the first positional information is updated by updating a first variance value of the first positional information to a second variance value smaller than the first variance value.

5. The map production method according to claim 1, wherein the third sensor is installed in the first region, the map information of the first region is expressed in a first coordinate system, the sensed region of the third sensor is expressed in a second coordinate system, and the map production method further includes performing transformation from the second coordinate system into the first coordinate system.

6. The map production method according to claim 1, wherein the third sensor is provided in a second mobile robot which is in the first region and is different from the first mobile robot, the map information of the first region is expressed in a first coordinate system, the sensed region of the third sensor is expressed in a second coordinate system of the second mobile robot, and the map production method further includes performing transformation from the second coordinate system into the first coordinate system.

7. A map production method to be performed by a first mobile robot which moves in a first region and includes a first sensor and a second sensor, the map production method comprising:

acquiring first information from the first sensor, the first information indicating an amount of movement of the first mobile robot;

acquiring second information from the second sensor, the second information indicating a distance from a first object in an observation region of the first mobile robot to the first mobile robot;

acquiring third information from a third sensor provided in the first region and being physically separate from the first mobile robot, the third information including video information of an observation region of the third sensor;

acquiring a sensed region of the second sensor which is calculated based on the first information and the second information;

acquiring a sensed region of the third sensor which is calculated based on the third information;

judging, based on the sensed region of the second sensor, the sensed region of the third sensor, and map information of the first region which is stored in advance in the first mobile robot, whether a second object in a second region is changed from a first position to a second position, the second region being outside of the sensed region of the second sensor and within the sensed region of the third sensor; and updating the map information of the first region for the second region if the second object is judged to be changed from the first position to the second position.

8. The map production method according to claim 7, further comprising:

estimating a current position and posture of the first mobile robot based on the first information and the second information, wherein the sensed region of the second sensor is calculated based on the current position and posture of the first mobile robot.

9. The map production method according to claim 8, wherein if the current position of the first mobile robot is not present in the sensed region of the third sensor and the sensed region of the second sensor does not overlap with the sensed region of the third sensor, the map information of the first region is updated for the second region.

10. The map production method according to claim 7, wherein the map information of the first region for the second region is updated by updating reliability of first positional information indicating a position of the second object.

11. The map production method according to claim 10, wherein the reliability of the first positional information is updated by updating a first variance value of the first positional information to a second variance value larger than the first variance value.

12. The map production method according to claim 11, wherein the second variance value is made larger than the first variance value in accordance with an amount of change from the first position to the second position.

13. The map production method according to claim 11, further comprising:

updating a third variance value of a third region, for which the second information is not acquired from the second sensor for a predetermined time, to a fourth variance value larger than the third variance value for the map information.

14. The map production method according to claim 7, wherein the third sensor is installed in the first region, the map information of the first region is expressed in a first coordinate system, the sensed region of the third sensor is expressed in a second coordinate system, and the map production method further includes performing transformation from the second coordinate system into the first coordinate system.

15. The map production method according to claim 7, wherein the third sensor is provided in a second mobile robot which is in the first region and is different from the first mobile robot, the map information of the first region is expressed in a first coordinate system, the sensed region of the third sensor is expressed in a second coordinate system of the second mobile robot, and the map production method further includes performing transformation from the second coordinate system into the first coordinate system.

16. A mobile robot which moves in a first region, the mobile robot comprising:

a first sensor; and a second sensor, wherein the mobile robot acquires first information from the first sensor, the first information indicating an amount of movement of the mobile robot, acquires second information from the second sensor, the second information indicating a distance from a first object in an observation region of the mobile robot to the mobile robot, acquires third information from a third sensor provided in the first region and being physically separate from the mobile robot, the third information including video information of an observation region of the third sensor, acquires a sensed region of the second sensor which is calculated based on the first information and the second information, acquires a sensed of the third sensor which is calculated based on the third information, judges whether the sensed region of the second sensor overlaps with the sensed region of the third sensor, and updates map information of the first region which is stored in advance in the mobile robot for a second region in which the first object exists if the sensed region of the second sensor is judged to overlap with the sensed region of the third sensor.

17. A mobile robot which moves in a first region, the mobile robot comprising:

a first sensor; and a second sensor, wherein the mobile robot acquires first information from the first sensor, the first information indicating an amount of movement of the mobile robot, acquires second information from the second sensor, the second information indicating a distance from a first object in an observation region of the mobile robot to the mobile robot, acquires third information from a third sensor provided in the first region and being physically separate from the mobile robot, the third information including video information of an observation region of the third sensor, acquires a sensed region of the second sensor which is calculated based on the first information and the second information, acquires a sensed region of the third sensor which is calculated based on the third information, judges, based on the sensed region of the second sensor, the sensed region of the third sensor, and map information of the first region which is stored in advance in the mobile robot, whether a second object in a second region is changed from a first position to a second position, the second region being outside of the sensed region of the second sensor and within the sensed region of the third sensor, and updates the map information of the first region for the second region if the second object is judged to be changed from the first position to the second position.

18. A map production system, comprising:

a mobile robot which includes a first sensor and a second sensor and moves in a first region;

a third sensor provided in the first region and being physically separate from the mobile robot; and a server connected to the mobile robot and the third sensor, wherein the server acquires first information from the first sensor, the first information indicating an amount of movement of the mobile robot, acquires second information from the second sensor, the second information indicating a distance from a first object in an observation region of the mobile robot to the mobile robot, acquires third information from the third sensor installed in the first region, the third information including video information of an observation region of the third sensor, acquires a sensed region of the second sensor which is calculated based on the first information and the second information, acquires a sensed region of the third sensor which is calculated based on the third information, judges whether the sensed region of the second sensor overlaps with the sensed region of the third sensor, and updates map information of the first region which is stored in advance in the mobile robot for a second region in which the first object exists if the sensed region of the second sensor is judged to overlap with the sensed region of the third sensor.

19. A map production system comprising:

a mobile robot which includes a first sensor and a second sensor and moves in a first region;

a third sensor provided in the first region and being physically separate from the mobile robot; and a server connected to the mobile robot and the third sensor, wherein the server acquires first information from the first sensor, the first information indicating an amount of movement of the mobile robot, acquires second information from the second sensor, the second information indicating a distance from a first object in an observation region of the mobile robot to the mobile robot, acquires third information from the third sensor provided in the first region, the third information including video information of an observation region of the third sensor, acquires a sensed region of the second sensor which is calculated based on the first information and the second information, acquires a sensed region of the third sensor which is calculated based on the third information, judges, based on the sensed region of the second sensor, the sensed region of the third sensor, and map information of the first region which is stored in advance in the mobile robot, whether a second object in a second region is changed from a first position to a second position, the second region being outside of the sensed region of the second sensor and within the sensed region of the third sensor, and updates the map information of the first region for the second region if the second object is judged to be changed from the first position to the second position.

* * * * *